United States Statutory Invention Registration [19]

[11] Reg. Number: H233

Tracy [43] Published: Mar. 3, 1987

[54] SMOKE PRODUCING COMPOSITION

[75] Inventor: Gene V. Tracy, Bel Air, Md.

[73] Assignee: The United States of America as represented by the Secretary of the Army, Washington, D.C.

[21] Appl. No.: 903,629

[22] Filed: Aug. 29, 1986

[51] Int. Cl.[4] ..... C06B 29/10

[52] U.S. Cl. ..... 149/83; 149/117

*Primary Examiner*—John F. Terapane
*Assistant Examiner*—Eric Jorgensen
*Attorney, Agent, or Firm*—Anthony T. Lane; Harold H. Card, Jr.; Edward F. Costigan

[57] ABSTRACT

The present invention is an essentially non-toxic, smoke-producing, pyrotechnic composition. The composition uses 1,4 benzenedicarboxylic acid which produces a superior visual screening smoke when vaporized by heat provided a reaction between suitable fuel and oxidizer. The composition additionally contains potassium chlorate and sugar. The composition burns at a low temperature without a visual flame and is suited for use in smoke grenades and smoke pots.

4 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SMOKE PRODUCING COMPOSITION

GOVERNMENT RIGHTS

The invention described herein may be manufactured, used, and licensed by or for the Government for Governmental purposes without the payment to me of any royalties thereon.

FIELD OF USE

This invention relates to a pyrotechnic composition containing 1,4benzenedicarboxylic acid.

BACKGROUND OF THE INVENTION

The most common pyrotechnic formulations used to produce white smoke are based on the reaction between hexachloroethane and zinc to produce zinc chloride and other products. There are other chlorinated organic compounds which have been used in place of hexachloroethane, but one of the products is still zinc chloride. All of these formulations are very efficient smoke producing compositions because zinc chloride is hygroscopic, and absorbs moisture out of the atmosphere, greatly increasing the weight of the smoke produced. The major problem associated with the above cited formulations is the toxicity of the zinc chloride.

There are various other formulations containing elemental phosphorous which have also been used. The smoke produced by formulations of this type contain oxides of phosphorous. These oxides are also hygroscopic, and provide a quantity of smoke that may be several times the weight of the initial phosphorous. While the hydrated oxides are irritants, the main problem with this formulation is the intense fire developed during burning.

Further, there are other typical formulations which have been used but they produce smoke by subliming sulfur. These involve mixing an oxidizer with an excess of sulfur. The heat evolved during the reaction sublimes the excess sulfur present and the reaction results in the formation of sulfur oxides which are toxic.

SUMMARY OF INVENTION

It is an object of this invention to provide a smoke-producing composition which is essentially non-toxic.

Another object of this invention is to provide a pyrotechnic smoke-producing composition which contains 1,4-benzenedicarboxylic acid.

It has been found that 1,4-benzenedicarboxylic acid produces a superior visual screening smoke when vaporized by the heat provided by the reaction of a suitable fuel and oxidizer. The pyrotechnic mixture containing 1,4benzenedicarboxylic acid burns at a relatively low temperature. Smoke grenades and smoke pots containing the present formulations do not produce a visual flame when functioning and, as a result, do not present the fire hazard of many typical pyrotechnics used to produce visual screening smoke. Further, tests on the composition of this invention indicate that the smoke produced is essentially non-toxic. These facts, in conjunction with the relatively low operating temperature and lack of a visual flame, make the composition of this invention attractive for a variety of applications. As is known, typical pyrotechnic smoke formulations of the art often create a fire hazard when operated in the field. The composition of this invention does not produce a visible flame and, effectively eliminates this problem. In addition, the actual temperature of the burning pyrotechnic mix is relatively low when compared to typical pyrotechnic mix smoke formulations.

1,4-benzenedicarboxylic acid is intimately mixed with a suitable pyrotechnic fuel and oxidizer such as sucrose and potassium chlorate. When the reaction between the fuel and the oxidizer is initiated with a suitable ignition mixture such as Chemical Corp. Starter Mixture VI (Drawing B143-7-3), the heat of reaction causes the 1,4-benzenedicarboxylic acid to sublime. This is an endothermic process which absorbs heat from the reaction. The resulting vapor provides a positive pressure inside the container, and it is then forced out the exit ports at a high velocity. Once outside of the hot environment of the reaction zone, the vapor condenses into a dense white smoke. Both subjective field tests and quantitative laboratory measurements confirm the high opacity of this smoke to light in the visual region of the spectrum.

| Broad Composition | |
|---|---|
| Ingredients | Percent by Weight |
| Potassium Chlorate | 18 to 30 |
| Sugar | 14 to 27 |
| 1,4-benzenedicarboxylic acid | 50 to 68 |

It must be remembered that if the percent by weight of one of the ingredients of a pyrotechnic formulation is altered, the percentage of one or more of the other ingredients must be altered to maintain the total composition. In other words, if one component is increased by a specific percentage by weight, the other ingredients must be decreased by a total of that specific percentage. In a pyrotechnic formulation of the present type, this may tend to amplify the effect. For instance, in a mixture containing fuel, oxidizer, and 1,4-benzenedicarboxylic acid, if the percentage of fuel and oxidizer are increased while keeping their ratio constant, the result would be a faster burn rate. Since the amount of 1,4-benzenedicarboxylic acid, which acts as a coolant and retards the burn rate, must be reduced by a corresponding amount, this would also tend to increase the burn rate.

The concentration of 1,4-benzenedicarboxylic acid in the formulations tested have ranged from a low of 50 percent to a high of 68 percent by weight. Due to the fact that 1,4-benzendicarboxylic acid is the smoke producing ingredient of the formulation, it is advantageous to keep this amount as high as possible. As this percentage is increased, however, and the proportional amounts of fuel and oxidizer are reduced while keeping their ratio constant, the result is a slower burning rate. Increasing the 1,4-benzenedicarboxylic acid content of the formulation also results in a slower burning rate because it acts as a coolant in the mix. In the extreme case, this will result in a formulation that will not burn. Also, if the burn rate becomes too slow, the efficiency of the formulation decreases. This is because insufficient heat is produced to sublime the 1,4-benzenedicarboxylic acid in an effective manner.

If the amount of 1,4-benzenedicarboxylic acid is decreased in the formulation, while holding the fuel and oxidizer ratio constant, it would result in a formulation that produces less total smoke, although it would burn at a faster or higher rate because of the reduced cooling effect. In the above instance, the 1,4-benzenedicarboxylic acid would be replaced with an inert material. As the percentage of 1,4-benzenedicarboxylic acid is decreased, and the combined percentage of fuel and oxidizer is increased by the same amount, keeping their ratio constant, the resulting formulation will also have a faster burn rate and would produce less total smoke. In either of the above instances, however, more smoke per unit time may be produced.

The percentage of potassium chlorate tested in the formulations have ranged from a low of 18 percent to a high of 30 percent by weight. As the oxidizer content is increased, the burn rate increases. This assumes that the ratio of fuel to oxidize remains constant. Experiments which involved formulations containing 30 percent to 50 percent by weight of potassium chlorate, without sugar as fuel, resulted in deflagration. Potassium chlorate is a good oxidizer and, in absence of sugar, it will react with the 1,4-benzenedicarboxylic acid if the relative quantities are appropriate to support combustion. If the percent of potassium chlorate is reduced, and the ratio of fuel to oxidizer remains constant, the reaction rate will decrease. A point is reached where the reaction can no longer sustain itself and a dud will result.

Fuel, in the form of sugar, has ranged from a low of 14 percent to a high of 27 percent by weight. The amount of sugar present in the formulation is related to the amount of potassium chlorate in the formulation, and should be the stoichiometric quantity as a minimum. All the formulations tested have contained excess sugar with the exception of those formulations containing no added fuel. If the amount of sugar is decreased below the above stoichiometric requirement, a point would be reached where there would be insufficient fuel to sustain the reaction. At this point either a dud would result or the 1,4-benzenedicarboxylic acid would be oxidized.

There are many other materials that may be added to the formulation to alter its performance in a variety of areas. For example, binders such as nitrocellulose are added to improve the handling and consolidation characteristics of the mix. Also, magnesium carbonate or sodium bicarbonate can be added to neutralize any acid impurities that may be present or form during storage. The cited carbonates also function as coolants in the mixture and tend to reduce the reaction rate.

The following formulations illustrate the foregoing compositions that have burned successfully:

| COMPONENT | PERCENT BY WEIGHT | | | | | | |
|---|---|---|---|---|---|---|---|
| 1,4-benzenedicarboxylic acid | 54 | 68 | 60 | 59 | 50 | 50 | 50 |
| Sucrose | 15 | 14 | 15 | | 27 | 20 | 27 |
| Lactose | | | | 16 | | | |
| Potassium Chlorate | 26 | 18 | 22 | 22 | 23 | 30 | 13 |
| Potassium nitrate | | | | | | | 10 |
| Magnesium Carbonate | 3 | | | | | | |
| Sodium Bicarbonate | | | 2 | 3 | | | |
| Nitrocellulose | 2 | | | | | | |

There are other materials that may be successfully used in the present formulations. Lactose has been successfully used in place of sucrose and other similar carbohydrates would also work as well. These would include dextrine, starch, glucose, shellac, and red gum. However, in all cases, reformulation to allow for different stoichiometrics and their corresponding heat outputs would be necessary.

As for the oxidizer, potassium chlorate has the ability to sustain the reaction at the relatively low temperature developed with the 1,4-benzenedicarboxylic acid formulations. Mixtures of potassium chlorate and potassium nitrate have also been employed successfully.

PROCEDURE

The pyrotechnic mixture is made in the following manner:

Where applicable, the materials used in the composition should comply with the appropriate military specification for use in pyrotechnics. The 1,4-benzenedicarboxylic acid used was greater than 99% pure and the particle size was such that in a typical sample approximately 90% would pass a #60% sieve and approximately 60% would pass a #120 sieve.

The individual components of the mixture are carefully weighed in the proportions heretofore indicated. The sugar and potassium chlorate are screened through separate No. 60 sieves to break up any aggregation that may have occured during storage.

The individual component are then placed in a proper size mixing bowl in a manner that separates the fuel and oxidizer. In other words, the oxidizer would be first placed in the bowl, the other components would be added, and the fuel would be placed in the bowl lastly.

If the nitrocellulose is used as a binder, it is added at this time in the form of an 8 percent by weight solution in acetone. After the nitrocellulose is blended in, additional acetone is added to the mixing bowl until the mixture has the consistency of a very thick slurry.

Mixing is done in a proper size vertical plaetary blender.

As the acetone evaporates out of the mixture, the consistency will generally change from a thick slurry to that of a dough. This dough will break up ito smaller pieces as the mixing continues. When the mixture reaches a particle size that is approximately that of a fine gravel, mixing is stopped.

The mixture is then tansferred to a dryng tray, and placed in an explosive proof oven at 140° F. for 24 hours. At this point the mixture is removed from the oven and allowed to cool. It is now ready for storage or consolidation into pyrotechnic item in the conventional manner.

What is claimed:

1. An improved smoke-producing pyrotechnic comprising:

| Ingredients | Percent by Weight |
|---|---|
| a. Potassium chlorate | 18 to 30 |
| b. Sugar | 14 to 27 |
| c. 1,4-benzenedicarboxylic acid | 50 to 68. |

2. The composition of claim 1 containing sucrose.

3. The composition of claim 1 containing lactose.

4. The composition of claim 1 wherein 1,4-benzenedicarboxylic acid is present at about 60 percent by weight, sucrose is present at about 20 percent by weight, and potassium chlorate is present at about 20 percent by weight.

* * * * *